US008651506B2

(12) United States Patent
Wright

(10) Patent No.: US 8,651,506 B2
(45) Date of Patent: Feb. 18, 2014

(54) SPECIAL WHEELCHAIR DEVICE FOR FULLY SUPPORTING THE FEET OF THE USER

(76) Inventor: Sharon S Wright, Anderson, IN (US)

( * ) Notice: Subject to any disclaimer, the term of this patent is extended or adjusted under 35 U.S.C. 154(b) by 100 days.

(21) Appl. No.: 13/304,972

(22) Filed: Nov. 28, 2011

(65) Prior Publication Data

US 2012/0133109 A1 May 31, 2012

Related U.S. Application Data

(60) Provisional application No. 61/417,447, filed on Nov. 28, 2010.

(51) Int. Cl.
*A61G 5/10* (2006.01)
*B62J 25/00* (2006.01)

(52) U.S. Cl.
USPC ........................................ 280/291; 280/304.1

(58) Field of Classification Search
USPC .............. 280/250.1, 288.1, 291, 304.1, 288.4
See application file for complete search history.

(56) References Cited

U.S. PATENT DOCUMENTS 3,113,326 A * 12/1963 Hyde et al. ........................ 5/484
3,367,327 A 2/1968 Rybcznki
3,848,922 A * 11/1974 Blanford .................... 297/219.1
3,860,285 A 1/1975 Hartman
3,863,984 A 2/1975 Sickels
4,227,742 A 10/1980 Thomas
4,243,265 A 1/1981 Hanik
4,486,048 A 12/1984 Meyer
4,564,238 A 1/1986 Wolpert et al.
D305,521 S 1/1990 Wiatrak et al.
D315,539 S 3/1991 Okamoto
D340,594 S 10/1993 Lambert
5,833,318 A 11/1998 Knight
6,089,658 A 7/2000 Law
6,773,073 B1 8/2004 Escobedo

* cited by examiner

*Primary Examiner* — Kevin Hurley
*Assistant Examiner* — Marc A Scharich
(74) *Attorney, Agent, or Firm* — John Ritchison; Ritchison Law Offices, PC

(57) ABSTRACT

A special wheelchair device made for fully supporting the feet of the user. It relates to a support accessory for providing added comfort to a person confined to a wheelchair. It spans the space between the left and right foot rests. It is comprised of a length of a sleeve made of a durable material and configured with at least one open end; an elongated cross-section; an external top surface with features like a tread; an essentially smooth bottom surface featuring a shelf-like recess; and an internal aperture with features wherein one of the end with an internal aperture of the device may slide over and essentially encase either of the foot plates of the wheelchair and wherein the opposite end with the shelf may rest on the other un-encased foot plate which results in a closure of the space between the two foot plates.

14 Claims, 8 Drawing Sheets

Section B - B

Open end 32

Section D - D 41
71
31C

E
31B
40

40

Section E - E
31B
E

SPECIAL WHEELCHAIR DEVICE FOR FULLY SUPPORTING THE FEET OF THE USER

CROSS-REFERENCE TO RELATED APPLICATIONS

This application claims the benefit of Provisional Patent Application Ser. No. 61/417,447 filed Nov. 28, 2010 by Sharon S. Wright and entitled "Special wheelchair device for fully supporting the feet of the user".

FIELD OF INVENTION

This invention is a special wheelchair device for fully supporting the feet of the user. The present device relates to wheelchair foot rest or supports and more particularly pertains to a new wheelchair support accessory for providing added comfort to a person confined to a wheelchair.

FEDERALLY SPONSORED RESEARCH

None.

SEQUENCE LISTING OR PROGRAM

None.

BACKGROUND

Field of Invention and Prior Art

A. Introduction to Problem Addressed:

The use of both wheelchair feet and wheelchair leg supports is known in the prior art. Wheelchair leg supports heretofore devised and utilized are known to consist basically of familiar, expected and obvious structural configurations, notwithstanding the myriad of designs encompassed by the crowded prior art which have been developed for the fulfillment of countless other objectives and requirements. Millions of wheel chairs, new and old, have simple foot rests (foot plates) that are attached so that the tubes of the chair can be removed. They are all inherently designed so that the tubes connected to the foot rest mechanisms may be removed; so that the whole mechanism can swing away; and, so that there is left a defined space or gap between each side. However, the defined space between the left and right plates can be problematic for many if not most users who need and desire a full rest plate across the full expanse of the wheel chair plates and leave no unsupported space. The PROBLEM ADDRESSED IS the elimination of this space or gap.

B. Prior Art:

It is believed that this product is unique in its design and technologies. However, in prior art, disclosures have been made for wheelchair supports with many of the disclosures including complex devices. Prior art begins with U.S. Pat. No. 3,367,327 issued in 1968 to Rybcznski for a foot restraining means. What is shown is an attachable device that is connected to footplates with tools and then restrains the feet. Movement is restricted unlike the new Wright device and the restrain requires tools to put into place and attach to the wheelchair. Another U.S. Pat. No. 3,860,285 issued in 1975 to Hartman for a combined wheelchair tray and footrest. The combination device teaches a combined wheelchair, tray and foot rest assembly having a mechanism for permitting the tray and footrest to be moved horizontally and preventing the accidental removal from the wheelchair. Further, the mechanism permits the tray to be swung from a position of use to a stored position adjacent the side of the wheelchair. The device must be assembled with the wheelchair with tools, creates pinch points and needlessly replaces the already provided footplates. This is more costly and less safe than the Wright device shown here.

A further prior art is shown in U.S. Pat. No. 3,863,984 issued in 1975 to Sickels was for a leg-supporting-and-retaining device attachable to an elevatable legrest of a wheelchair. Taught here is a device that attaches to an elevatable legrest of a wheel chair for supporting and retaining the leg of an individual sitting in the wheel chair upon the legrest. The device is composed of a single sheet of resilient material configured at one end into a clamp for detachably clamping the device to the elevatable legrest and configured at the other end into a support for releasably supporting and retaining the leg upon the legrest when the legrest is at any desired elevation. The device restrains the leg to prevent movement. Wright permits full movement of legs and feet and supports the bottom of the feet for the comfort of the patient/user. Next, in U.S. Pat. No. 4,227,742 issued in 1980 to Thomas was for a multi-position, retractable legrest as part of a wheelchair. Another leg device shown here demonstrates a full wheelchair which includes an improved, retractable multi-position leg rest apparatus. The leg rest is attached to the frame of the footrest of the wheelchair in a conventional manner. The leg rest cushion is carried on a frame which slidably engages the footrest frame. A rotatable U-shaped transverse member comprises part of the leg rest frame and is adapted to selectively engage a hook on the underside of the leg rest cushion to lock the rear end of the cushion in an elevated position. The rear of the leg rest cushion can be lowered by disengaging the tubular member from the hook. The device is more complex and costly than the simple Wright device.

In U.S. Pat. No. 4,243,265 was issued in Hanik to 1981 for a patient chair slipper. Demonstrated here is an open-ended slipper suitable for attachment to the footplate of a patient chair, comprising a generally rectangular base strip adapted for placement upon a footplate and straps means for creating openings for receiving a user's foot. Other means shown are for attaching the device from its lower surface to the footplate. The device merely restrains foot movement and does not fill the gap between the footplates like that of the Wright invention. In still another U.S. Pat. No. 4,486,048 issued in 1984 to Meyer was for a leg support for a wheelchair. Here Meyer taught a leg support for a wheelchair, comprising a vertical supporting tube, which is detachably mountable on said wheelchair, the upper end of said supporting tube having a horizontal arm mounted thereon, which arm extends in the direction of travel and on which arm a leg support carrier, supporting a foot-plate and a calf-plate, is pivotably mounted by means of its upper end, in which the leg support carrier is formed by an external telescopic tube and an internal telescopic tube inserted into the external telescopic tube, both tubes being pivotably mounted on the arm about their own respective swivel axles. This is a complex leg support which is more expensive to attach with tools and a person of some technical skills.

Additionally, in U.S. Pat. No. 4,564,238 was issued in 1986 to Wolpert, Jr. for a leg-rests for a modified wheelchair. The Wolpert concept was an improved wheel chair foot/leg rest that discloses a device that can be retro-fitted onto existing wheel chair. A series of parallel tubes attach under the wheel chair seat, and house sliding tubes that carry a rotating foot/leg rest. This requires tools and is a bulky add to the chair. When not in use it requires some sizeable storage areas. In U.S. Pat. No. Des 305,521 was issued in 1990 to Wiatrak, et al for a wheelchair foot board. The art shown there was a single side footplate. Nothing is taught that fills the gap between the footplates. In another U.S. Pat. No. Des 315,539 issued in 1991 to Okamoto for a footplate assembly for a wheelchair. In this device is shown a strap that fits the side of a footplate. Nothing is taught that fills the gap between the footplates.

Prior art in U.S. Pat. No. Des. 340,594 that was issued in 1993 to Lambert was for a leg supports for wheelchair occupants. Here is shown a separate foot stand or rest device that is paced separate from the wheelchair with the wheelchair to ostensibly support feet. Unlike Wright it does not couple to the wheelchair and “move” when the chair is moved. It also is in a fixed configuration and is not universal to all wheelchair spacing and configurations of the footplates. In another U.S. Pat. No. 5,833,318 issued in 1998 to Knight was for a wheelchair support accessory. This showed a wheelchair support accessory for a person confined to a wheelchair which includes a support board having a generally rectangular configuration. The support board has a long top edge, a long bottom edge and short opposed side edges. The device is made of several pieces and has fitted recesses that may not be configured for universal usage. It is complex and made of more expensive materials than the Wright invention.

Recently, in U.S. Pat. No. 6,089,658 was issued in 2000 to Law for a wheelchair footplate cover and stabilizer. Shown was a cover and stabilizer made of a thin ridged material that slips over wheelchair footplates. The preferred material is metal and has several breaks and angles. The patient and staff are exposed to sharp corners when fitting the device over the footrests. The device requires expensive process tooling to the break presses or the molding equipment and tools. The Wright device gas no sharp corners and may be made of various materials including recycled materials. Finally in U.S. Pat. No. 6,773,073 that was issued in 2004 to Escobedo was for an adjustable footrest. Taught here was an adjustable foot rest for being used with a wheelchair to allow the foot of the user to positioned at a comfortable angle. The adjustable foot rest includes an adjustment assembly being designed for being coupled to hanger bracket of the wheel chair. A rest member is pivotally coupled to the adjustment assembly on the wheelchair. The rest member is designed for supporting the foot of the user when the user is sitting in the wheelchair and may be positioned at any angle. The device is more complex and requires tools to attach to the wheelchair, unlike the unique Wright device that assembles without tools and simply slips onto the wheelchair footplates.

While these devices described above in many respects fulfill their respective, particular objectives and requirements, the aforementioned patents do not disclose the new Wright wheelchair foot support accessory. None of them solve the problem of the unsupported space between the foot plates. None of the prior art anticipates the Wright invention nor show configurations or concepts that would make the Wright device obvious to one of ordinary skill in the area and art of wheelchair structures. The inventive Wright device includes a support board having a generally rectangular configuration that fits over the existing foot supports. The recess of the device is configured to engage an existing leg rest frame of a wheelchair.

In many respects, the wheelchair support accessory according to the present invention substantially departs from the conventional concepts and designs of the prior art, and in so doing provides an apparatus primarily developed for the purpose of providing added comfort to a person confined to a wheelchair. At the same time, a caretaker of the user finds placement of the device easy. However, as far as is known, there is no other special wheelchair device for fully supporting the feet of the user at the present time which fully provide these improvements and functional characteristics as the present device. It is believed that this device is made with fewer parts and with improved configurations and physical features to provide more functionality when compared to other currently utilized devices or methods to provide foot supports for wheelchairs. The particular combinations of materials and features are unique and novel. As stated above, the objectives and solutions of the Wright device are not anticipated by prior art.

SUMMARY OF THE INVENTION

The device herein is a special wheelchair device for fully supporting the feet of the user. It is a simple, sleeve-like device to span the space between the two (left and right) foot rests. The special wheelchair device for fully supporting the feet of the user is comprised of a length of a sleeve made of a durable material and configured with at least one open end; configured with an elongated cross-section; configured with an external top surface with features like a tread; configured with an essentially smooth bottom surface featuring a shelf-like recess; and configured with an internal aperture with features wherein one of the end with an internal aperture of the device may slide over and essentially encases either of the foot plates of the wheelchair and wherein the opposite unencased end with the shelf may rest on the other of the foot plates which results in a closure of the space between the two foot plates.

OBJECTIVES AND ADVANTAGES

There are several objectives and advantages of the special wheelchair device for fully supporting the feet of the user. There are currently no known wheelchair accessories or support devices that are effective at providing the objectives of this invention in a simple and common sense manner.

The invention presented is a special wheelchair device for fully supporting the feet of the user. This device relates to a growing need for a better means of support for the feet of persons in wheelchairs. Particularly, this new special wheelchair device for fully supporting the feet of the user is related to devices and methods to add simplicity, safety and ease for foot support with wheelchairs. Many wheelchair devices have been developed, but are too complex to use and very difficult to install. This is particularly true for the elderly. Therefore, an easy-to-install and simple device that does not require tools is a major advantage and the main objective for this device.

The following TABLE A summarizes various advantages and objectives of the special wheelchair device for fully supporting the feet of the user. This list is exemplary and not limiting to the many advantages offered by this new device.

TABLE A

Various Benefits, Advantages and Objectives
This device:

| ITEM | BENEFIT |
|---|---|
| 1. | Increases the support for feet of the user, especially the elderly, infirm or others who are not ambulatory and who may spend long periods of time in the wheelchair. |
| 2. | Is easy to handle and install for wheelchair users and caretakers. |

TABLE A-continued

| Various Benefits, Advantages and Objectives This device: | |
|---|---|
| ITEM | BENEFIT |
| 3. | Requires no tools for installation. |
| 4. | Is simple to manufacture. |
| 5. | Has no sharp edges or pinch points. |
| 6. | May be manufactured from recycled materials. |
| 7. | Is a universal design that fits practically all designs of wheelchairs both new and used. |
| 8. | Is small and compact so that it is easy to package for sale or kept in storage |

Noteworthy is that other advantages and additional features of the special wheelchair device for fully supporting the feet of the user will be more apparent from the accompanying drawings and from the full description of the device. For one skilled in the art of wheel chair devices and accessories, it is readily understood that the features shown in the examples with this device are readily adapted for improvement to other types of mechanisms and devices for use with wheelchairs.

DESCRIPTION OF THE DRAWINGS

Figures

The accompanying drawings, which are incorporated in and constitute a part of this specification, illustrate preferred and alternative embodiments for the special wheelchair device for fully supporting the feet of the user. The drawings, together with the summary description given above and a detailed description given below, serve to explain the principles of the special wheelchair support device. It is understood, however, that the device is not limited to only the precise arrangements and instrumentalities shown.

DESCRIPTION OF THE DRAWINGS

Reference Numerals

The following list refers to the drawings:

TABLE B

| Reference numbers. | |
|---|---|
| Ref # | Description |
| 31 | Preferred embodiment of the special wheelchair device for fully supporting the feet of the user |
| 31A | Prototype device |
| 31B | Alternative embodiment with split open end |
| 31C | Alternative embodiment with single end, hinged plate |
| 32 | Open end of device |
| 32A | Aperture |
| 33 | Opposite open end of device |
| 34 | Shelf configuration |
| 35 | Top surface |
| 35A | Angle, rounded or beveled or the like corners - no cut configuration |
| 36 | Treads, rough surface or the like |
| 37 | Closer retainer feature of vanes or the like |
| 38 | Bottom surface |
| 38A | Means for securing flap of sheet (adhesive, weld, or the like) |
| 39 | Sides of device |
| 40 | Telescopic slip fit on the alternative embodiment 31B |
| 41 | Hinged single plate |
| 60 | Wheel chair user - elderly, infirm, non-ambulatory, recovering injured or the like |
| 61 | Feet of the user |
| 70 | wheelchair |
| 71 | Foot plate tubular support structure |
| 72A | Foot plate of the wheelchair |
| 72B | Foot plate of the wheelchair |
| 80 | Prior Art Patent No. U.S. Pat. No. 6,773,073 |
| 81 | Prior Art Patent No. U.S. Pat. No. 6,089,658 |
| 82 | Prior Art Patent No. U.S. Pat. No. 5,833,318 |

DETAILED DESCRIPTION OF PREFERRED EMBODIMENT

The present invention presented is the special wheelchair device for fully supporting the feet of the user. This device relates to a growing need for better means to support feet when the user is in a wheelchair. Specifically, the present device relates to wheelchair foot rest or supports and more particularly pertains to a new wheelchair support accessory for providing added comfort and safety to a person confined to a wheelchair. The preferred embodiment of the special wheelchair device for fully supporting the feet of the user is comprised of a length of a sleeve made of a durable material and configured with at least one open end; configured with an elongated cross-section; configured with an external top surface with features like a tread; configured with an essentially smooth bottom surface featuring a shelf-like recess; and configured with an internal aperture of the device which slides over and essentially encases one of the foot plates of the wheelchair and wherein the shelf extension end may rest on top of the other foot plate which results in a spanning and closure of the space between the two foot plates.

Figure 10C:
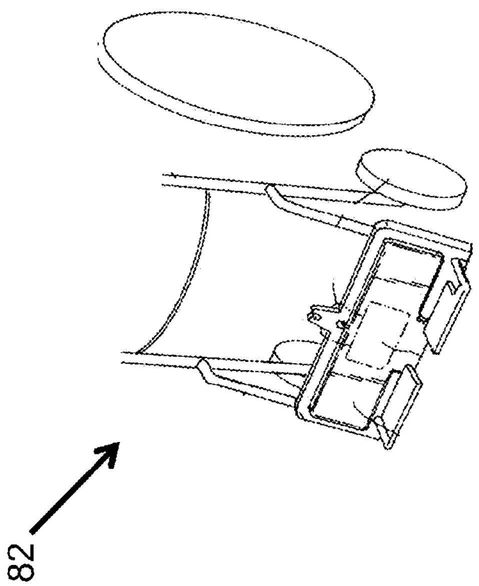
Fig. 10 C Prior Art
FIGS. 10 A through 10 C are examples of prior art for the general wheelchair devices for supporting the feet of the user.
Figure 10B:
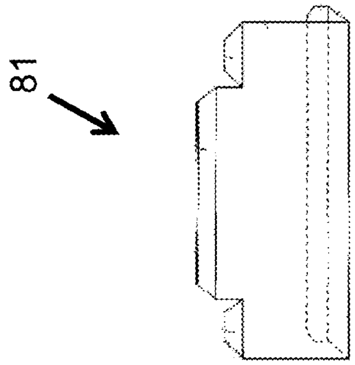
Fig. 10 B Prior Art
Figure 10A:
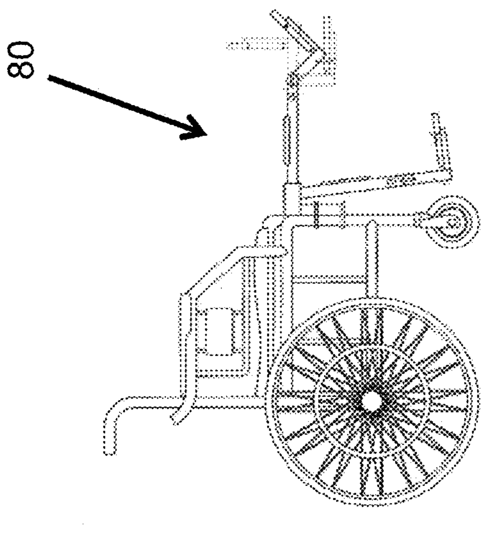
Fig. 10 A Prior Art

There is shown in FIGS. 1-10 a complete detailed and operative embodiment of the special wheelchair device for fully supporting the feet of the user. In the drawings and illustrations, one notes well that the FIGS. 1 through 8 show details of the special configuration. FIG. 9 helps to describe its use and operation. FIG. 10 show prior art of support devices in the wheel chair attachment industry.

The advantages of the special wheelchair device for fully supporting the feet of the user are listed above in the introduction. Succinctly the benefits for the device are:

Increases the support for feet of the user, especially the elderly, infirm or others who are not ambulatory and who may spend long periods of time in the wheelchair.

Is easy to handle and install for the user and the caretaker.

Requires no tools for installation.

Is simple to manufacture.

Has no sharp edges or pinch points.

May be manufactured from recycled materials.

Is a universal design that fits practically all designs of wheelchairs both new and used.

Is small and compact so that it is easy to package for sale or kept in storage

The preferred embodiment of the special wheelchair device for fully supporting the feet of the user is comprised of a length of a sleeve made of a durable material and configured with at least one open end; configured with an elongated cross-section; configured with an external top surface with features like a tread; configured with an essentially smooth bottom surface featuring a shelf-like recess; and configured with an internal aperture with features wherein the internal aperture of the device may slide over and essentially encase either one of the foot plates of the wheelchair and wherein the opposite end with the extension shelf may rest on the other of the un-encased foot plates which results in a spanning and closure of the space between the two foot plates. Simple instructions for installation and use will be printed on the device.

The accompanying drawings, which are incorporated in and constitute a part of this specification, illustrate a preferred embodiment of the special wheelchair device for fully supporting the feet of the user. The drawings, together with the summary description given above and a detailed description given below, serve to explain the principles of the wheelchair foot support device. It is understood, however, that the device is not limited to only the precise arrangements and instrumentalities shown.

Figure 1:
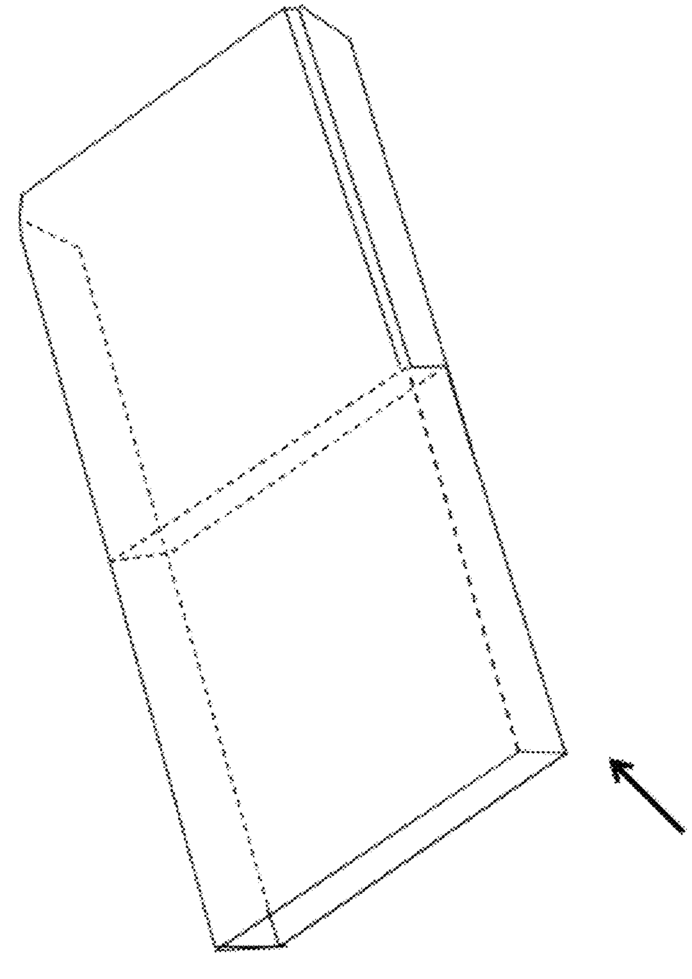
FIG. 1 is the general sketch of the special wheelchair device for fully supporting the feet of the user.

FIG. 1 is the general sketch of the preferred embodiment of the special wheelchair device 31 for fully supporting the feet 61 of the user 60. The components, features, materials and operation are described below.

Figure 2:
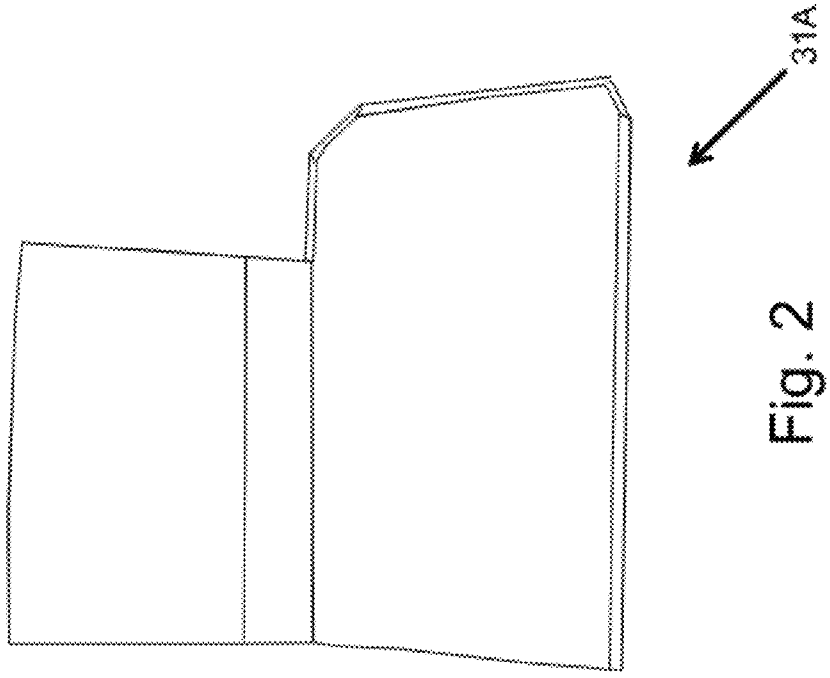
FIG. 2 shows a sketch of the prototype of the preferred embodiment of the special wheelchair device for fully supporting the feet of the user with the specific features.

FIG. 2 shows a sketch of the prototype 31A of the preferred embodiment (unfolded) of the special wheelchair device 31 for fully supporting the feet 61 of the user 60 with the specific features as shown in the following descriptions of the attached drawings and sketches.

Figure 3:
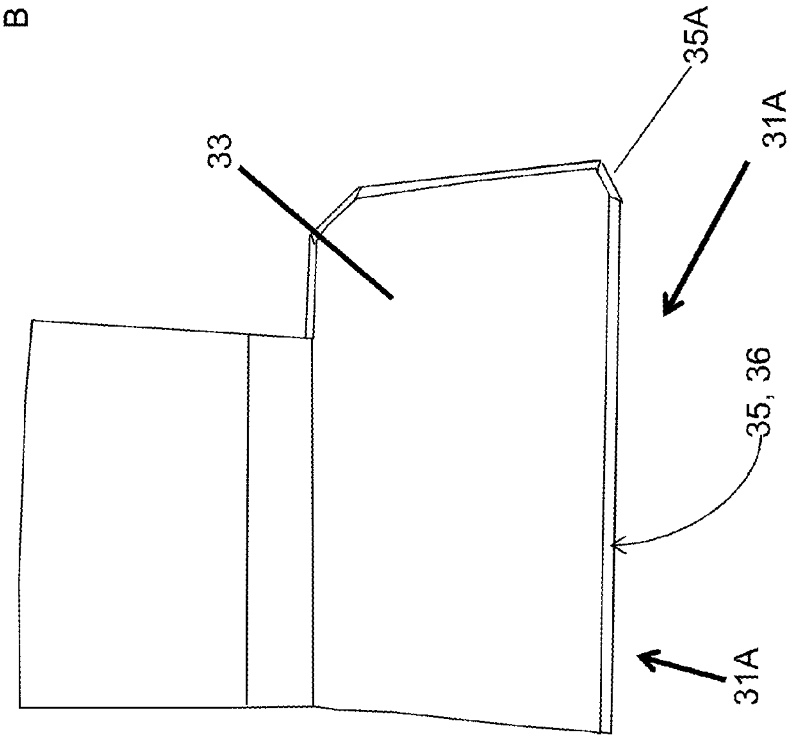
FIG. 3 shows a sketch of the prototype of the preferred embodiment of the special wheelchair device for fully supporting the feet of the user with the specific features and components noted.

FIG. 3 shows a sketch of the prototype 31A of the preferred embodiment of the special wheelchair device 31 for fully supporting the feet of the user with the specific features and components noted. Here one may view an open configuration showing the elements of the end 33 and the top surface 35 where the optional treads 36 (not shown) are located. One also should note the angle, rounded, beveled or the like corners 35A to provide a no cut configuration.

Figure 4A:
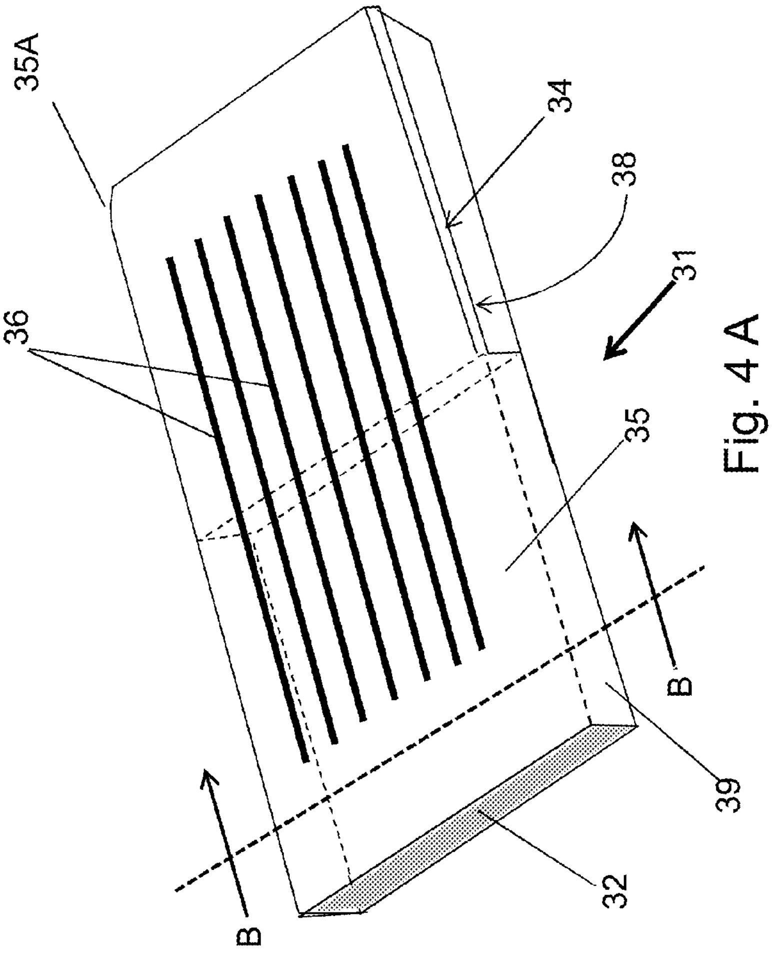
FIGS. 4 A and 4 B show the general sketch of the special wheelchair device for fully supporting the feet of the user with features and components noted.
Figure 4B:
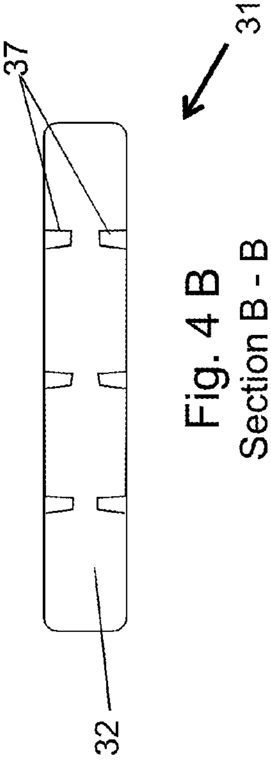

FIGS. 4 A and 4 B show the general sketch of the special wheelchair device 31 for fully supporting the feet 61 of the user 60 with features and components noted. In these sketches, one may see the top surface 35 with the optional tread-like or rough surface 36 that gives a certain amount of traction for the device 31 where the feet 61 rest. The joining point of the shelf feature 34 is at the end 33 on the bottom surface 38. The opposite end, the end 32 is seen. This is the part of the device 31 that removably yet securely encases either of the wheelchair 70 foot plates 72A and 72B (not shown in this view. The sides 39 connect the top surface 35 to the bottom extension of surface 38.

In FIG. 4 B the important retainer feature 37 is shown. As will be shown, this feature secures the foot plate by an interference fit or wedge as either foot plate is inserted into the device 31 in the open end 32, which is opposite the shelf end 33.

Figure 5A:
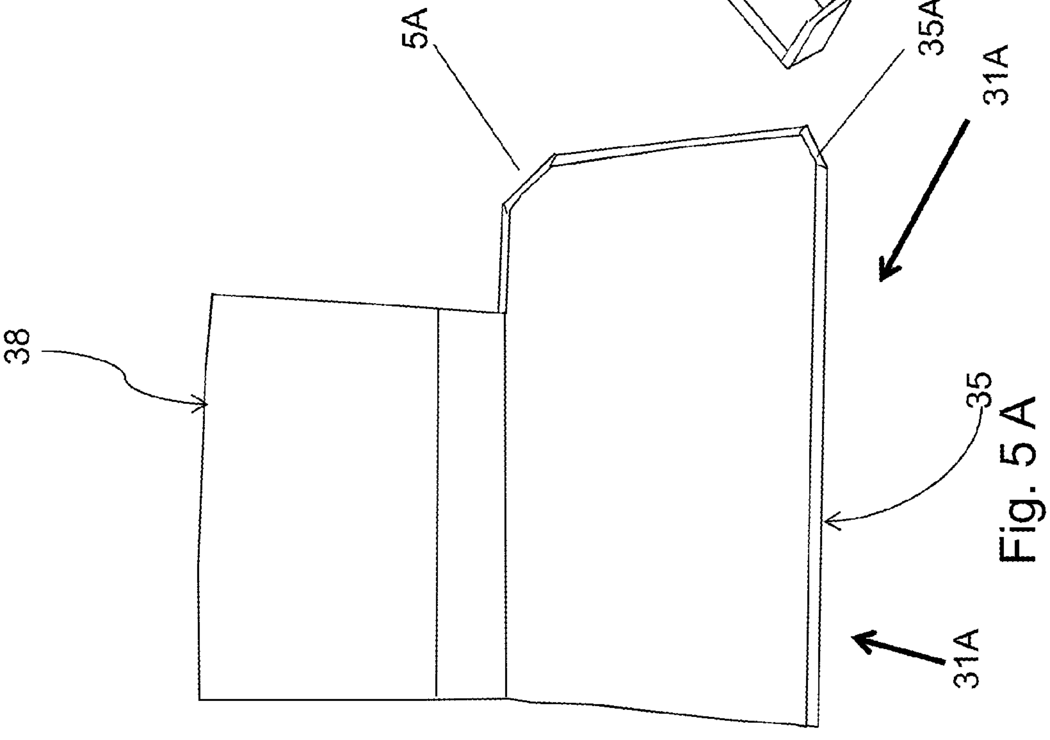
FIGS. 5 A through 5 C show additional sketches of the prototype of the preferred embodiment of the special wheelchair device for fully supporting the feet of the user with the specific features.
Figure 5B:
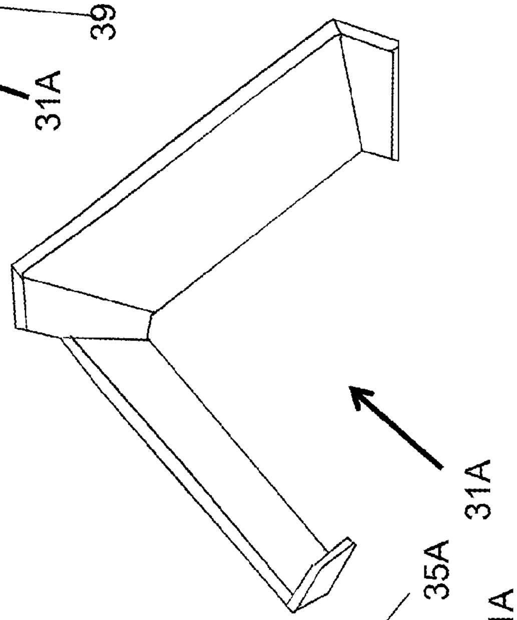
Figure 5C:
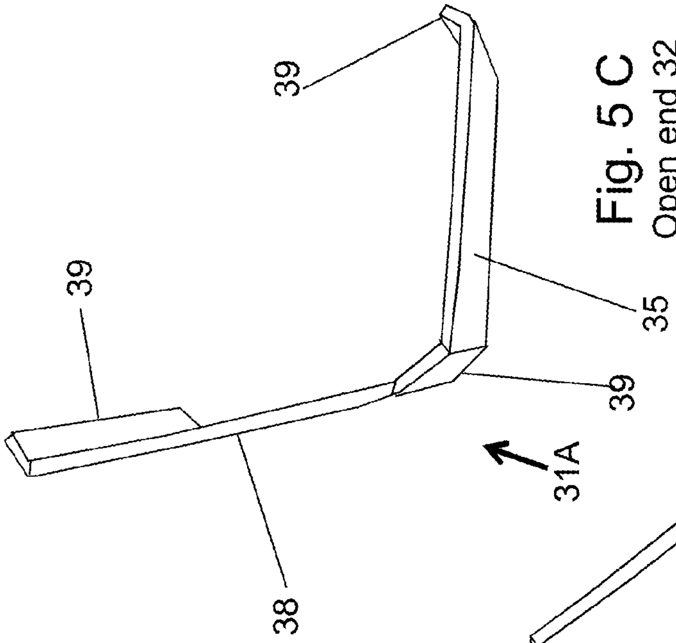

FIGS. 5 A through 5 C show additional sketches of the prototype 31A of the preferred embodiment of the special wheelchair device for fully supporting the feet 61 of the user 60 with the specific features. One may see that the prototype was stamped/cut from a formable material, then folded/bent to the desired shape. A glue or adhesive 38A material secures the surfaces of the device (if made of cardboard or a fiber sheet) as shown. If formed as one piece such as from metal or plastic, the adhesive is not required. FIG. 5 A shows an open view of the stamping/cutting of a flat initial piece of the device 31A with the bottom surface 38 and top surface 35 identified. FIG. 5 B shows a partially bent/folded view of the prototype 31A. FIG. 5 C shows a further step in the forming of the device prototype 31A with the sides 39, the top surface 35 and the bottom surface 38 all shown. One skilled in manufacturing devices and products similar to the device 31 has a full appreciation of the plethora of processes and materials that may be used to manufacture a special wheelchair device 31 for fully supporting the feet 61 of the user 60. As an example and not as a limitation for producing such a device 31, one skilled in manufacturing appreciates that the device 31 may be stamped from metal or a composite (paper-like, elastomeric rubber-like or plastic-like) and then formed or folded into the desired configuration. The sides and top may be contiguous in sheet form but some joining or means for securing 38A may require a welding (metals, plastic), adhesive (plastic, fiber, composites), or a special securing means such as a friction weld (plastic), heat weld, or other fastening means. Similarly, a composited or plastic material might be molded, a metal may be cast, or a fiber cardboard may be made from a slurry of mache' like substance and cast or molded . . . and later sealed if needed.

Figure 6B:
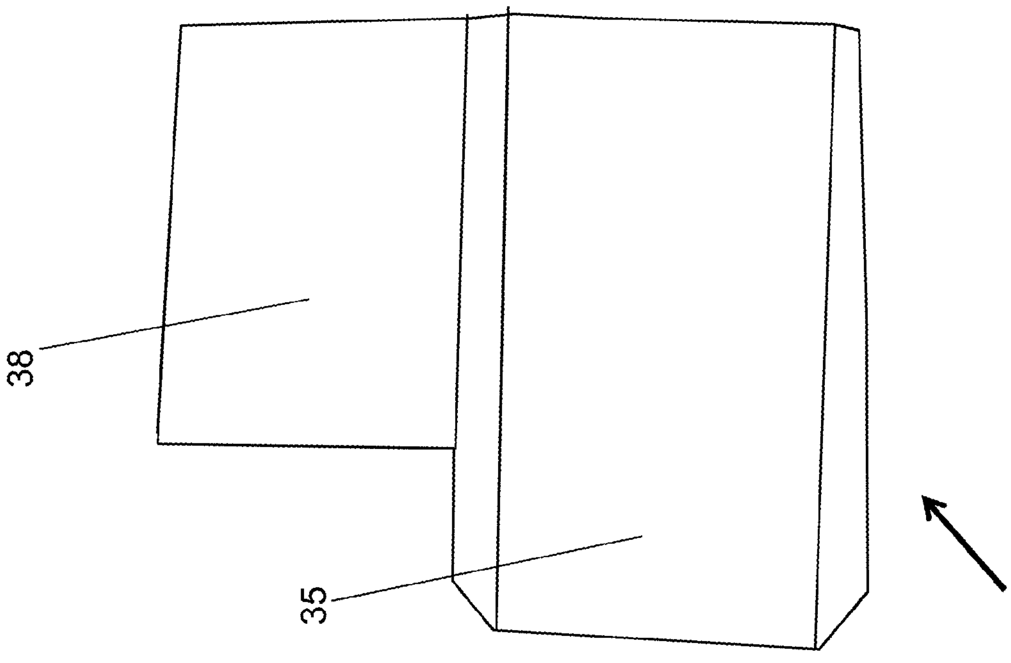
FIGS. 6 A and 6 *b* show more sketches of the prototype of the preferred embodiment of the special wheelchair device for fully supporting the feet of the user with the specific features.
Figure 6A:
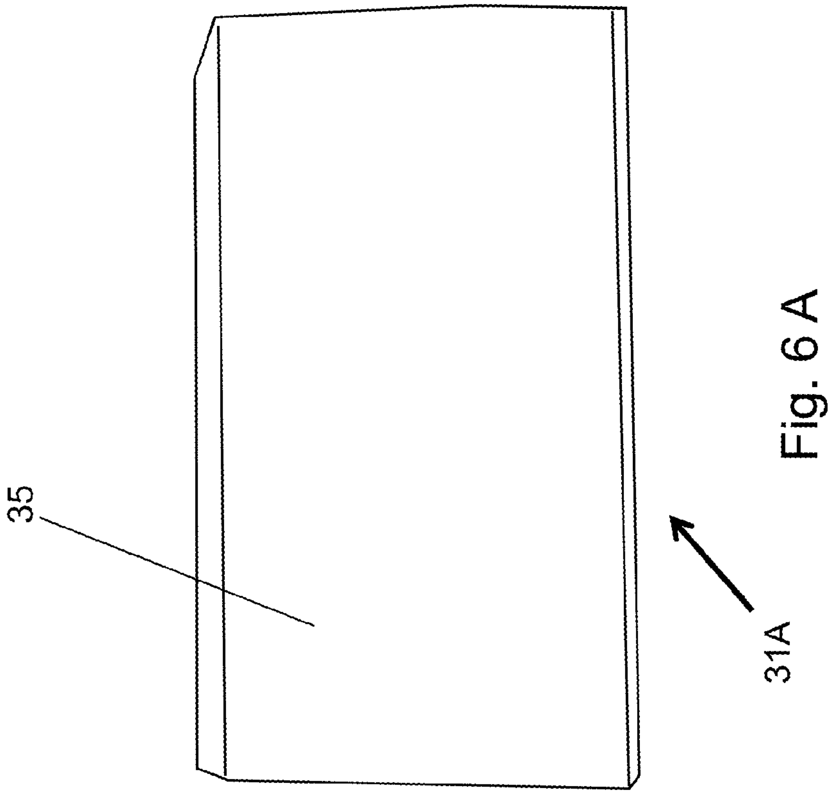

FIGS. 6 A and 6 B show more sketches of the prototype of the preferred embodiment 31A of the special wheelchair device 31 for fully supporting the feet 61 of the user 60 with the specific features. Here one may view the bottom 33 and top 35 in a closed (FIG. 6 A) and open (FIG. 6 B) position.

Figures 7A, 7B:
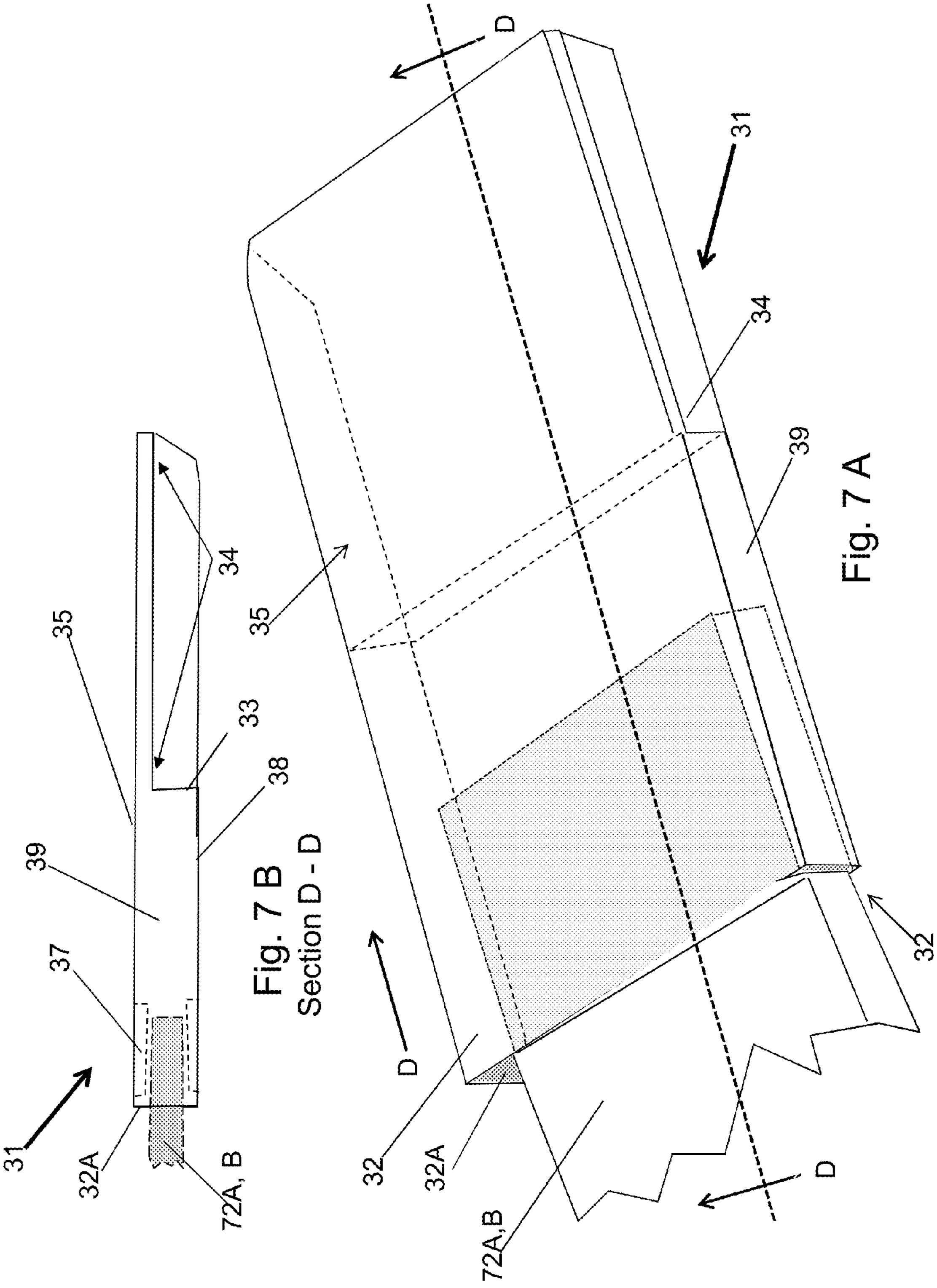
FIGS. 7 A and 7 B show more of the general sketches of the preferred embodiment of the special wheelchair device for fully supporting the feet of the user with features and components noted.

FIGS. 7 A and 7 B show more of the general sketches of the preferred embodiment 31 of the special wheelchair device for fully supporting the feet 61 of the user 60 with features and components noted. In FIG. 7 A, the side 39, the shelf 34, and the open end 32 are all depicted. Likewise the top surface 35 is shown with the treads or rough surface 36. Finally the foot plate 72A or 72B is shown starting to engage the open end 32 of the device 31. FIG. 7 B the cross section D-D of the device 31 is shown. The shelf end 33 is further depicted and the step like transformation on the bottom surface 38. The aperture 32A is open and permits the foot plates 72A or 72B to start to engage the device into the open end 32. One views also the closer vanes 37 that are tapered vane-like structures that interfere and grip or secure tightly the foot plates 72A or 72B as the plate engages the interior of the device 31 through the open end 32 aperture 32A. The vanes 37 may be of various shapes but provide an interference fit to the wheelchair foot plates. The materials and processes used to manufacture the device 31 may vary greatly. As a further example and not as a limitation the device may be made from a plastic or composite plastic of various types. A polyester, poly carbonate, estralon, co-polyesters and the like may be suitable. A durable, thin sheet plastic such as poly propylene, acrylic, poly urethane, urethane, and the like could prove useful as the material. Metals (such as stainless steel, aluminum, steel alloys, etc.) may be stamped and formed or cast (metals like aluminum, pot metals, etc.) to make the device 31. Any or all may have surface finished such as chrome, powdered materials paint and the like. Another material could be molded plastics or composites. Thermoplastic molding and blow molding may be inexpensive to produce the product with the configuration of this device 31. A composite fiber like cardboard or fiberboard may be attractive for stamping of casting a lower-cost device 31 in order to have a use-and-throw-away after one or more uses or a short time period. This could afford a hospital and nursing home facility a method to replace soiled or unsanitary devices that have been exposed to dirt, grime, food or other unsanitary products. Any material used of configuration would have rounded/safe edges.

Figures 8A, 8B, 8C:
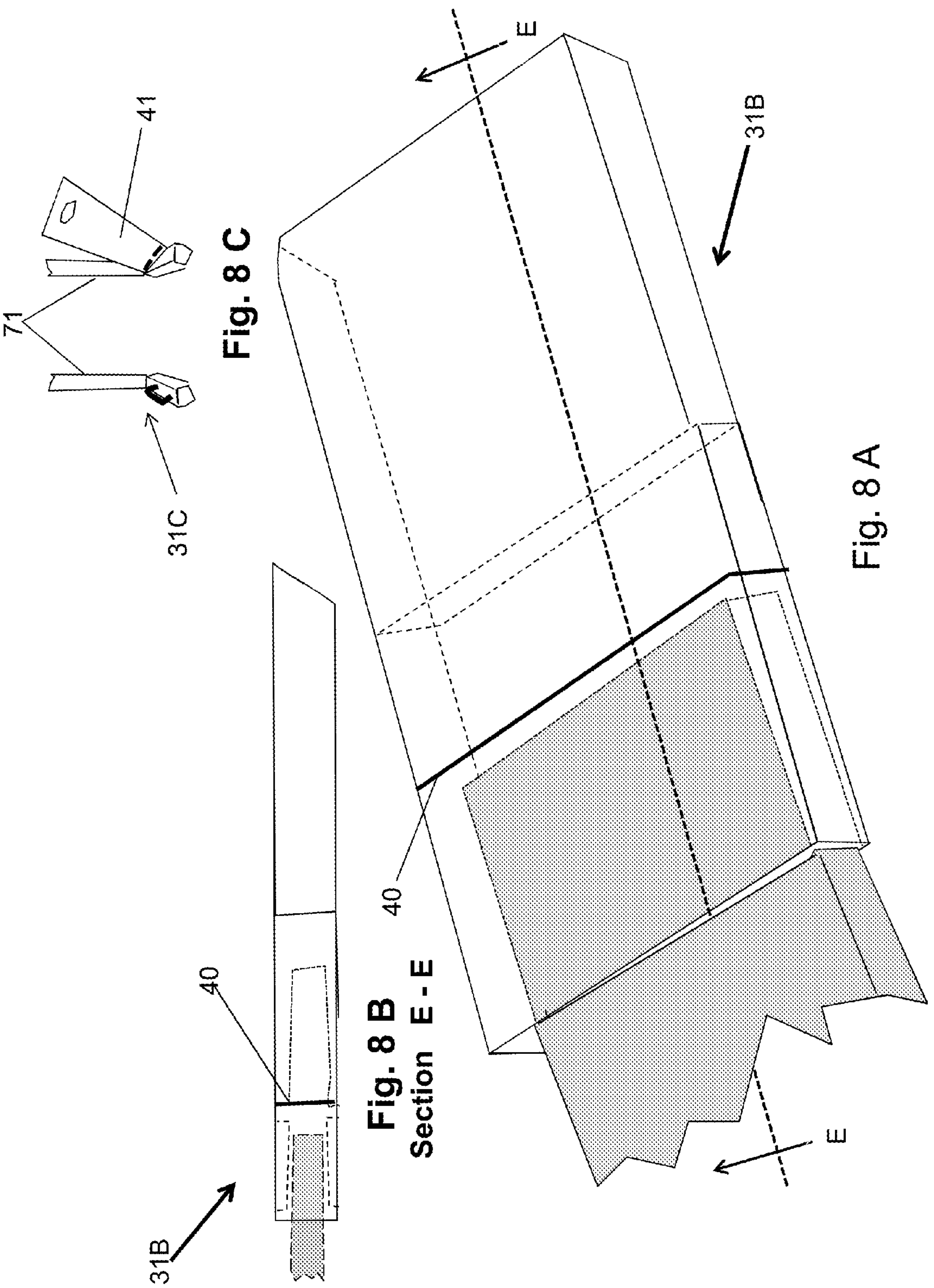
FIGS. 8 A through 8 C show the general sketches of alternative embodiments of the special wheelchair device for fully supporting the feet of the user with features and components noted.
Figure 9A:
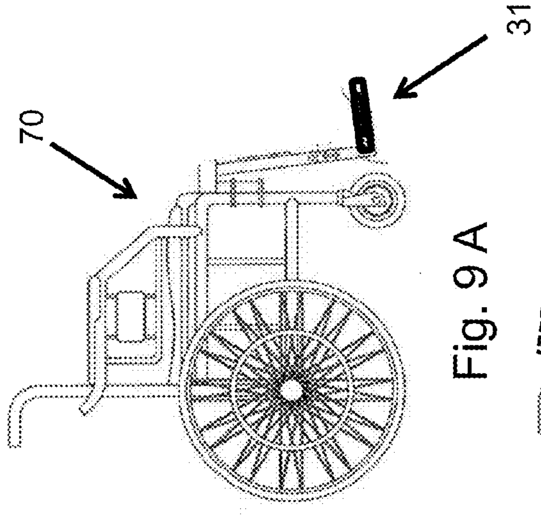
FIGS. 9 A through 9 D show the general sketches of the preferred embodiment of the special wheelchair device in operation.
Figure 9B:
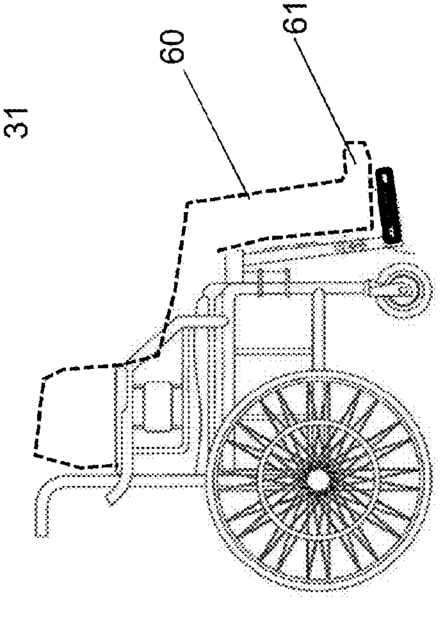
Figure 9C:
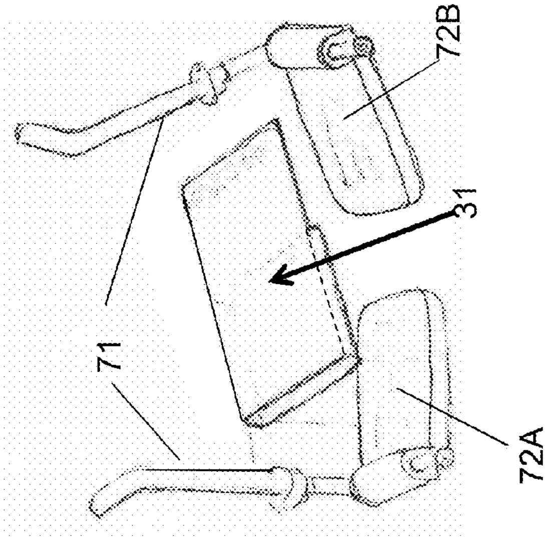
Figure 9D:
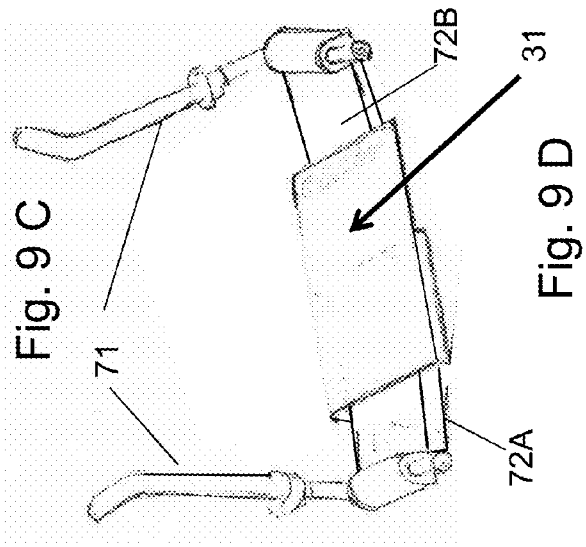

FIGS. 8 A through 8 C show of the general sketches of alternative embodiments 31B and 31C of the special wheelchair device 31 for fully supporting the feet of the user with features and components noted. In FIG. 8 B, the device 31B has essentially the same features and functions as the preferred device 31. In addition, there is a split point 40 where the device 31 is essentially two pieces. This allows the open end 32 to telescope/slip fit around an end 33. The open end 32 may be adjusted for the length of the device 31B which permits the invention to be used with new or existing (used) wheel chairs of variously sized openings between the foot plates 72A and 72B. In FIG. 8 C, the device 31C has a single plate 41 hinged and able to span the full space between legs 71.

FIGS. 9 A through 9 D show the general sketches of the preferred embodiment of the special wheelchair device in operation. These sketches are discussed below in the operations paragraphs.

FIGS. 10 A through 10 C are examples of prior art for the general wheelchair devices for supporting the feet of the user. FIG. 10 A shows a wheel chair leg support device 80 from a U.S. Pat. No. 6,773,073 issued to Escobedo in 2004. No special continuous foot support is shown. FIG. 10 B shows a complex utility device 81 called a wheel chair foot plate cover and stabilizer. The patent was issued in 2000 to Law for a Prior Art Utility U.S. Pat. No. 6,089,658. FIG. 10 C shows a wheel chair support accessory device 82 from 1998 Prior Art Utility U.S. Pat. No. 5,833,318 issued to Knight. None of these patents nor others cited above show the simple and functional configuration as the new Special wheelchair device for fully supporting the feet of the user 31.

All of the details mentioned here are exemplary and not limiting. Other components specific to describing the new special wheelchair device for fully supporting the feet of the user may be added, as a person having ordinary skill in the field of wheelchair accessories and supports and related devices in the health care appliance industry well appreciates.

Operation of the Preferred Embodiment

The preferred embodiment of the special wheelchair device for fully supporting the feet of the user has been described in detail above. The manner of how the device operates is described below. A person having ordinary skill in the field of wheelchair accessories and supports and related devices in the health care appliance industry, will note that the description above and the operation described here must be taken together to fully illustrate the concept of the special device 31.

FIGS. 9 A through 9 D show the general sketches of the preferred embodiment of the special wheelchair device 31 in operation. FIG. 9 A shows the basic wheel chair 70 with the device 31 already attached. FIG. 9 B shows the wheelchair 70 with a user/person 60 sitting in the chair with their feet 61 resting on the device 31. FIG. 9 C shows the device 31 ready to be removably and adjustably attached to the foot plates 72A and 72B. How to accomplish this is shown immediately below in Table C. Note that the foot plates 72A and 72B are removably and securely attached at the ends of the wheelchair tubular supports 71 which are in turn connected directly to the wheelchair 70 shown in FIG. 9 A. In FIG. 9 D the device 31 is shown being fully installed to the foot plates 72A and 72B with the open end 32 encasing foot plate 72A and the shelf 34 and end 33 under shelf 34 contiguous and touching/resting/supported by the foot plate 72B. One easily notes that this device 31 could easily be used in the reverse with the foot plate 72B encased and foot plate 72A as the support.

The simplicity to use this special wheelchair device 31 for fully supporting the feet of the user is demonstrated in the process below in Table C. This is exemplary and not meant to restrict and limit the process to use the special wheelchair device for fully supporting the feet of the user.

TABLE C

Process to use the device

| Step | Description<br>No tools required for Installation |
|---|---|
| 1 | Flip the foot plates 71A and 72B of the wheelchair 70 to a vertical position |
| 2 | Slip the open end 32 of the device 31 over either foot plate 72A or 72B |
| 3 | Hold-up the feet 61 of the user 60 |
| 4 | Lower the foot plate that does not have the device 31 attached |
| 5 | Lower the other foot plate that does have the device 31 attached and rest it onto the top of the other afore-lowered foot plate. |
| 6 | Lower the feet 61 of the user 60 |

With the above description or the product device and method to use, it is to be understood that the special wheelchair device for fully supporting the feet of the user is not to be limited to only the disclosed embodiment. The described features of the special device 31 are intended to cover various modifications and equivalent arrangements included within the spirit and scope of the description.

What is claimed for Letters Patent is:

1. A wheelchair device for fully supporting a pair of feet of a user, the device comprised of an essentially enclosed sleeve of a length, the sleeve with two ends, made of a durable material and configured with:

(a) at least one of the two ends as an open end;

(b) an elongated, encasing cross-section of the sleeve;

(c) a top surface of the sleeve with features;

(d) an essentially smooth bottom surface of the sleeve featuring a shelf at an end opposite the open end;

(e) at least two side surfaces;

(f) a means for securing the top and bottom surfaces; and (g) an internal aperture with features wherein the open end with an internal aperture can slide over and essentially encase one of a pair of foot plates of the wheelchair and wherein the opposite end with the shelf may rest on the other un-encased pair of foot plates which results in a closure of the space between the two foot plates.

2. The device according to claim 1 wherein the top surface feature is a series of treads.

3. The device according to claim 1 wherein the top surface feature is a series of corners at a junction with the sides, the corners for preventing cuts.

4. The device according to claim 3 wherein the corners are a beveled configuration.

5. The device according to claim 3 wherein the corner is a rounded configuration.

6. The device according to claim 1 wherein the feature of the internal aperture is at least one vane for creating an interference fit between the device and the encased foot plate.

7. The device according to claim 1 wherein the durable material is a metal.

8. The device according to claim 7 wherein the metal with features is selected from the group consisting of stainless steel, aluminum, pot metal, and steel alloys.

9. The device in claim 8 wherein the feature of the metal is a surface finish selected from the group consisting of chrome plating, powder coating or painting.

10. The device according to claim 1 wherein the durable material is a composite material.

11. The device according to claim 10 wherein the composite material is a reinforced plastic.

12. The device according to claim 11 wherein the reinforced plastic is a material composition selected from the group consisting of a polyester, a poly carbonate, an estralon, a co-polyesters, a poly propylene, an acrylic, a poly urethane, and a urethane composition.

13. The device according to claim 10 wherein the composite material is a fiber-like material selected from the group consisting of cardboard, fiberboard, and pressed wood-board.

14. A wheelchair device for fully supporting a pair of feet of a user, the device comprised of an essentially enclosed sleeve of a length, the sleeve with two ends, made of a durable material and configured with:

(a) at least one of the two ends as an open end;

(b) an elongated, encasing cross-section of the sleeve;

(c) a top surface of the sleeve with non-slip tread and rounded corners;

(d) an essentially smooth bottom surface of the sleeve featuring a shelf at an end opposite the open end;

(e) at least two side surfaces;

(f) an adhesive means for securing the surfaces; and (g) an internal aperture with vanes wherein the open end with an internal aperture can slide over and essentially encase one of a pair of foot plates of the wheelchair and wherein the opposite end with the shelf may rest on the other un-encased pair of foot plates which results in a closure of the space between the two foot plates.

* * * * *